US011632785B2

(12) United States Patent
Wang et al.

(10) Patent No.: US 11,632,785 B2
(45) Date of Patent: Apr. 18, 2023

(54) RECEIVE GRANT FOR A SIDELINK TRANSMISSION

(71) Applicant: QUALCOMM Incorporated, San Diego, CA (US)

(72) Inventors: Hua Wang, Basking Ridge, NJ (US); Sony Akkarakaran, Poway, CA (US); Jing Sun, San Diego, CA (US); Lik Hang Silas Fong, Bridgewater, NJ (US); Yisheng Xue, San Diego, CA (US); Piyush Gupta, Bridgewater, NJ (US); Tao Luo, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 53 days.

(21) Appl. No.: 17/303,004

(22) Filed: May 18, 2021

(65) Prior Publication Data

US 2021/0410178 A1 Dec. 30, 2021

Related U.S. Application Data

(60) Provisional application No. 63/044,887, filed on Jun. 26, 2020.

(51) Int. Cl.
*H04W 72/14* (2009.01)
*H04W 72/04* (2023.01)
(Continued)

(52) U.S. Cl.
CPC ........... *H04W 72/14* (2013.01); *H04L 1/1819* (2013.01); *H04W 72/042* (2013.01);
(Continued)

(58) Field of Classification Search
CPC ............... H04W 72/14; H04W 72/042; H04W 72/0446; H04W 76/11; H04W 92/18; H04L 1/1819
See application file for complete search history.

(56) References Cited

U.S. PATENT DOCUMENTS 10,411,872 B2 * 9/2019 Suzuki ................. H04W 48/16
2011/0317569 A1 * 12/2011 Kneckt ............ H04W 74/0833
370/252

(Continued)

FOREIGN PATENT DOCUMENTS

EP 2824848 A1 * 1/2015 ........... H04L 5/0032
WO 2020068252 A1 4/2020

OTHER PUBLICATIONS

International Search Report and Written Opinion—PCT/US2021/070580—ISA/EPO—dated Oct. 11, 2021.

(Continued)

*Primary Examiner* — Jael M Ulysse
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a base station, a downlink communication that includes an indication of a sidelink grant associated with the first UE. The first UE may identify, based at least in part on the sidelink grant, one or more sidelink resources in which a second UE is to transmit sidelink control information (SCI) to the first UE. The SCI may include information associated with a sidelink data transmission from the second UE to the first UE. Numerous other aspects are provided.

30 Claims, 10 Drawing Sheets

(51) Int. Cl.
*H04W 72/0446* (2023.01)
*H04L 1/1812* (2023.01)
*H04W 76/11* (2018.01)
*H04W 92/18* (2009.01)

(52) U.S. Cl.
CPC ........ *H04W 72/0446* (2013.01); *H04W 76/11* (2018.02); *H04W 92/18* (2013.01)

(56) References Cited

U.S. PATENT DOCUMENTS

| | | | | |
|---|---|---|---|---|
| 2015/0078279 | A1* | 3/2015 | Ko | H04W 52/383 370/329 |
| 2016/0338094 | A1* | 11/2016 | Faurie | H04W 72/085 |
| 2017/0215154 | A1* | 7/2017 | Kim | H04W 52/383 |
| 2017/0230956 | A1* | 8/2017 | Kim | H04B 1/713 |
| 2017/0280469 | A1* | 9/2017 | Park | H04W 76/14 |
| 2018/0139724 | A1* | 5/2018 | Loehr | H04W 72/02 |
| 2018/0324848 | A1 | 11/2018 | Baghel et al. | |
| 2019/0052436 | A1* | 2/2019 | Desai | H04L 5/0053 |
| 2019/0364590 | A1* | 11/2019 | Sartori | H04W 72/14 |
| 2020/0029318 | A1* | 1/2020 | Guo | H04W 72/042 |
| 2020/0351033 | A1* | 11/2020 | Ryu | H04W 72/0453 |
| 2020/0355834 | A1* | 11/2020 | Jin | H04W 4/50 |
| 2021/0385842 | A1* | 12/2021 | Zhao | H04L 5/0055 |
| 2022/0377785 | A1* | 11/2022 | Yao | H04W 72/0453 |

OTHER PUBLICATIONS

ZTE: "Resource Scheme of FeD2D Relay", 3GPP TSG RAN WG1 Meeting #90, 3GPP Draft, R1-1712918—5.2.9.2.3.2 Resource Scheme of FED2D Relay, 3rd Generation Partnership Project (3GPP), Mobile Competence Centre, 350, Route Des Lucioles, F-06921 Sophia-Antipolis Cedex, FR, vol. RAN WG1, No. Prague, Czech Republic, Aug. 21, 2017-Aug. 25, 2017, 5 Pages, Aug. 20, 2017 (Aug. 20, 2017), XP051315728, Retrieved from the Internet: URL: http://www.3gpp.org/ftp/Meetings_3GPP_SYNC/RAN1/Docs/ [retrieved on Aug. 20, 2017] the whole document.

* cited by examiner

RECEIVE GRANT FOR A SIDELINK TRANSMISSION

CROSS-REFERENCE TO RELATED APPLICATION

This Patent Application claims priority to U.S. Provisional Patent Application No. 63/044,887, filed on Jun. 26, 2020, and entitled "RECEIVE GRANT FOR A SIDELINK TRANSMISSION." The disclosure of the prior Application is considered part of and is incorporated by reference into this Patent Application.

FIELD OF THE DISCLOSURE

Aspects of the present disclosure generally relate to wireless communication and to techniques and apparatuses for a receive grant for a sidelink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a base station, a downlink communication that includes an indication of a sidelink grant associated with the first UE; and identifying, based at least in part on the sidelink grant, one or more sidelink resources in which a second UE is to transmit sidelink control information (SCI) to the first UE, wherein the SCI includes information associated with a sidelink data transmission from the second UE to the first UE.

In some aspects, a method of wireless communication performed by a base station includes configuring a sidelink grant associated with a first UE, wherein the sidelink grant indicates one or more sidelink resources in which a second UE is to transmit, to the first UE, SCI that includes information associated with a sidelink data transmission from the second UE to the first UE; and transmitting, to the first UE, a downlink communication that includes an indication of the sidelink grant.

In some aspects, a non-transitory computer-readable medium storing a set of instructions for wireless communication includes one or more instructions that, when executed by one or more processors of a first UE, cause the firstUE to: receive, from a base station, a downlink communication that includes an indication of a sidelink grant associated with the first UE; and identify, based at least in part on the sidelink grant, one or more sidelink resources in which a second UE is to transmit SCI to the first UE, wherein the SCI includes information associated with a sidelink data transmission from the second UE to the first UE.

In some aspects, a non-transitory computer-readable medium storing a set of instructions for wireless communication includes one or more instructions that, when executed by one or more processors of a base station, cause the base station to: configure a sidelink grant associated with a first UE, wherein the sidelink grant indicates one or more sidelink resources in which a second UE is to transmit, to the first UE, SCI that includes information associated with a sidelink data transmission from the second UE to the first UE; and transmit, to the first UE, a downlink communication that includes an indication of the sidelink grant.

In some aspects, a first UE for wireless communication includes a memory; and one or more processors coupled to the memory, the memory and the one or more processors configured to: receive, from a base station, a downlink communication that includes an indication of a sidelink grant associated with the first UE; and identify, based at least in part on the sidelink grant, one or more sidelink resources in which a second UE is to transmit SCI to the first UE, wherein the SCI includes information associated with a sidelink data transmission from the second UE to the first UE.

In some aspects, a base station for wireless communication includes a memory; and one or more processors coupled to the memory, the memory and the one or more processors configured to: configure a sidelink grant associated with a first UE, wherein the sidelink grant indicates one or more sidelink resources in which a second UE is to transmit, to the first UE, SCI that includes information associated with a sidelink data transmission from the second UE to the first UE; and transmit, to the first UE, a downlink communication that includes an indication of the sidelink grant.

In some aspects, an apparatus for wireless communication includes means for receiving, from a base station, a downlink communication that includes an indication of a sidelink grant associated with the first apparatus; and means for identifying, based at least in part on the sidelink grant, one or more sidelink resources in which a second apparatus is to transmit SCI to the first apparatus, wherein the SCI includes information associated with a sidelink data transmission from the second apparatus to the first apparatus.

In some aspects, an apparatus for wireless communication includes means for configuring a sidelink grant associated with a first UE, wherein the sidelink grant indicates one or more sidelink resources in which a second UE is to transmit, to the first UE, SCI that includes information associated with a sidelink data transmission from the second UE to the first UE; and means for transmitting, to the first UE, a downlink communication that includes an indication of the sidelink grant.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
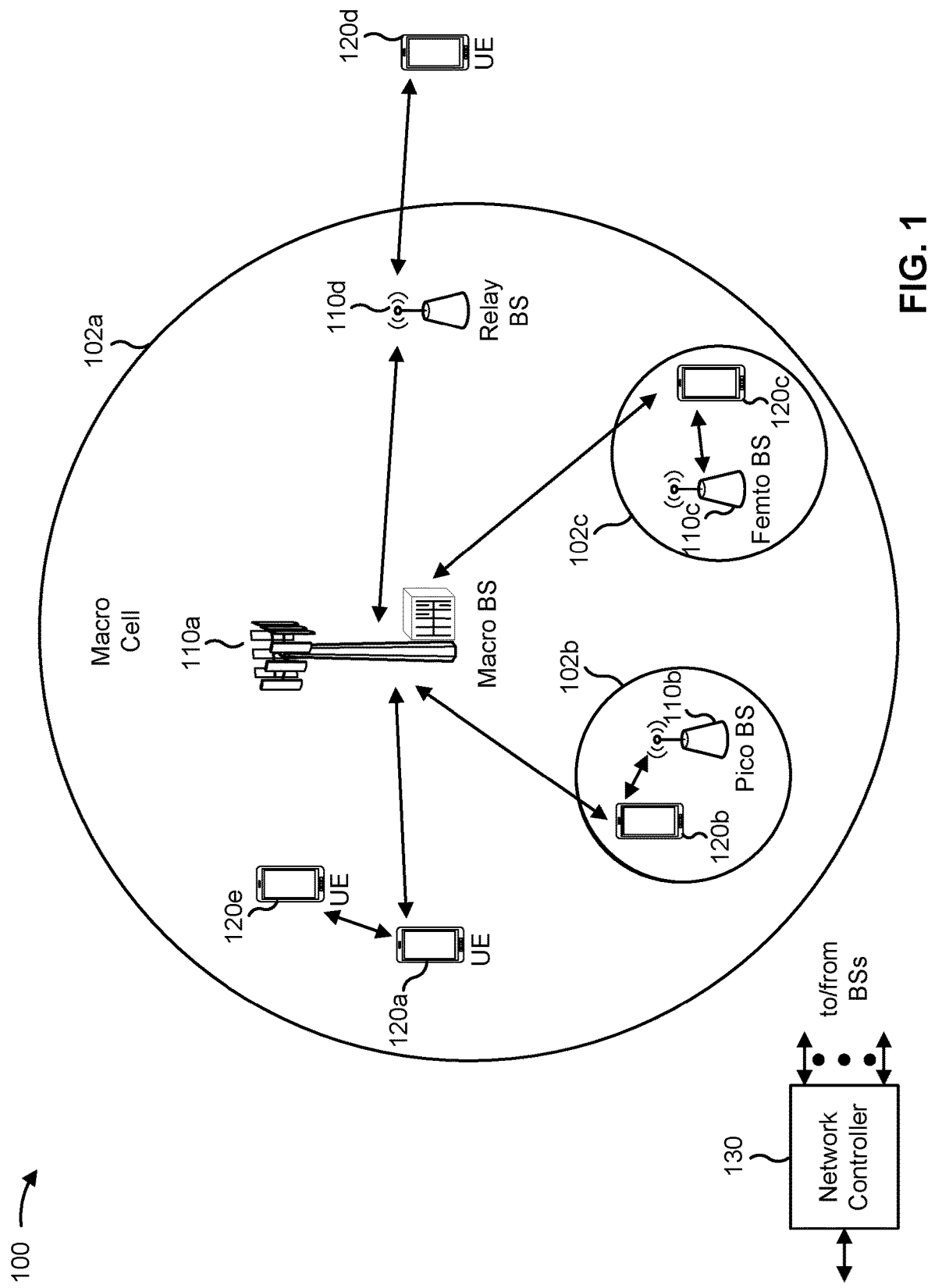
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like. Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
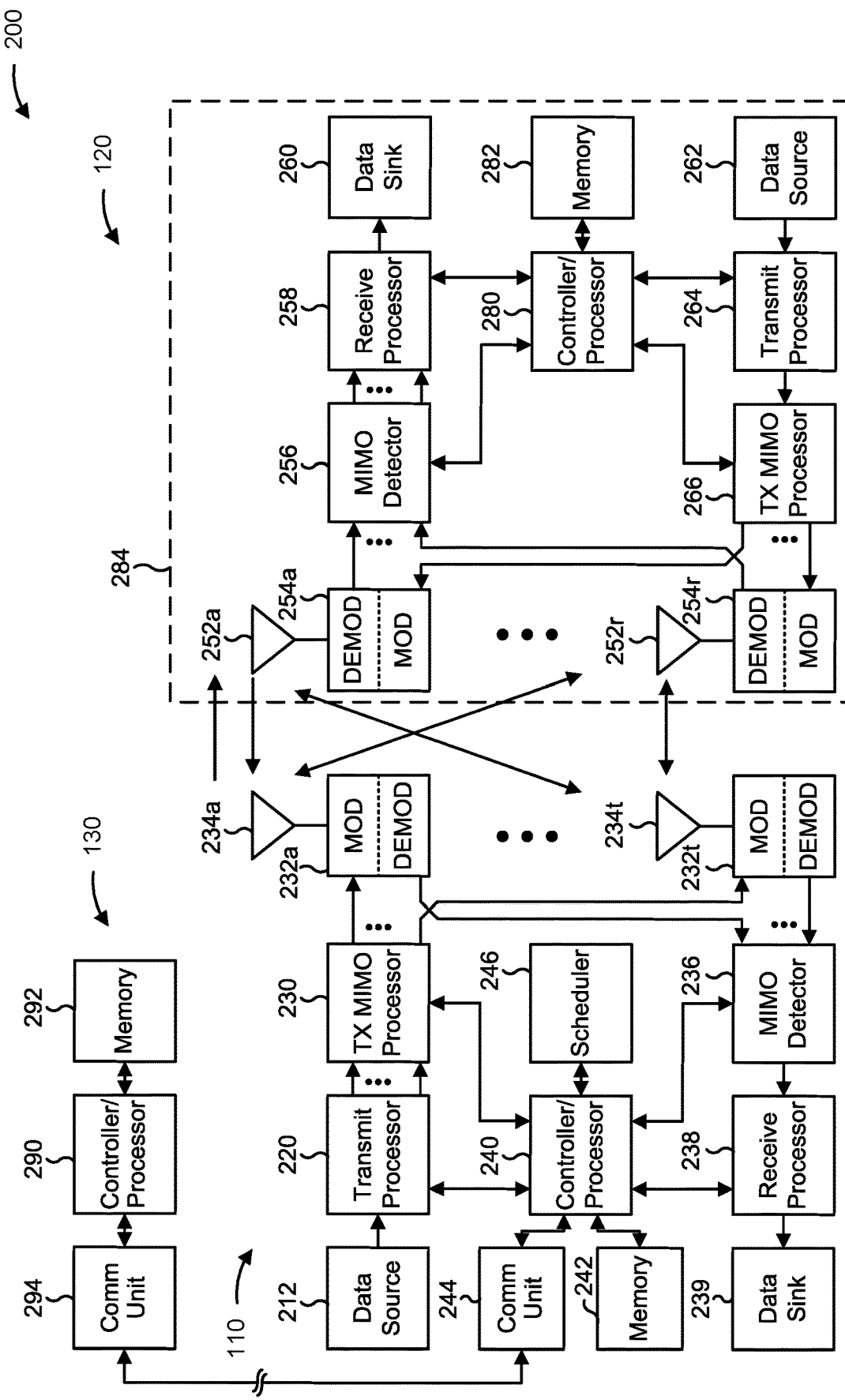
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-10).

Controller/processor 240 of base station 110, controller/processor 280 of UE 120, and/or any other component(s) of FIG. 2 may perform one or more techniques associated with a receive grant for a sidelink transmission, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a first UE 120 may include means for receiving, from a base station, a downlink communication that includes an indication of a sidelink grant associated with the first UE 120, means for identifying, based at least in part on the sidelink grant, one or more sidelink resources in which a second UE 120 is to transmit sidelink control information (SCI) to the first UE 120, wherein the SCI includes information associated with a sidelink data transmission from the second UE 120 to the first UE 120, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring a sidelink grant associated with a first UE 120, wherein the sidelink grant indicates one or more sidelink resources in which a second UE 120 is to transmit, to the first UE 120, SCI that includes information associated with a sidelink data transmission from the second UE 120 to the first UE 120, means for transmitting, to the first UE 120, a downlink communication that includes an indication of the sidelink grant, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
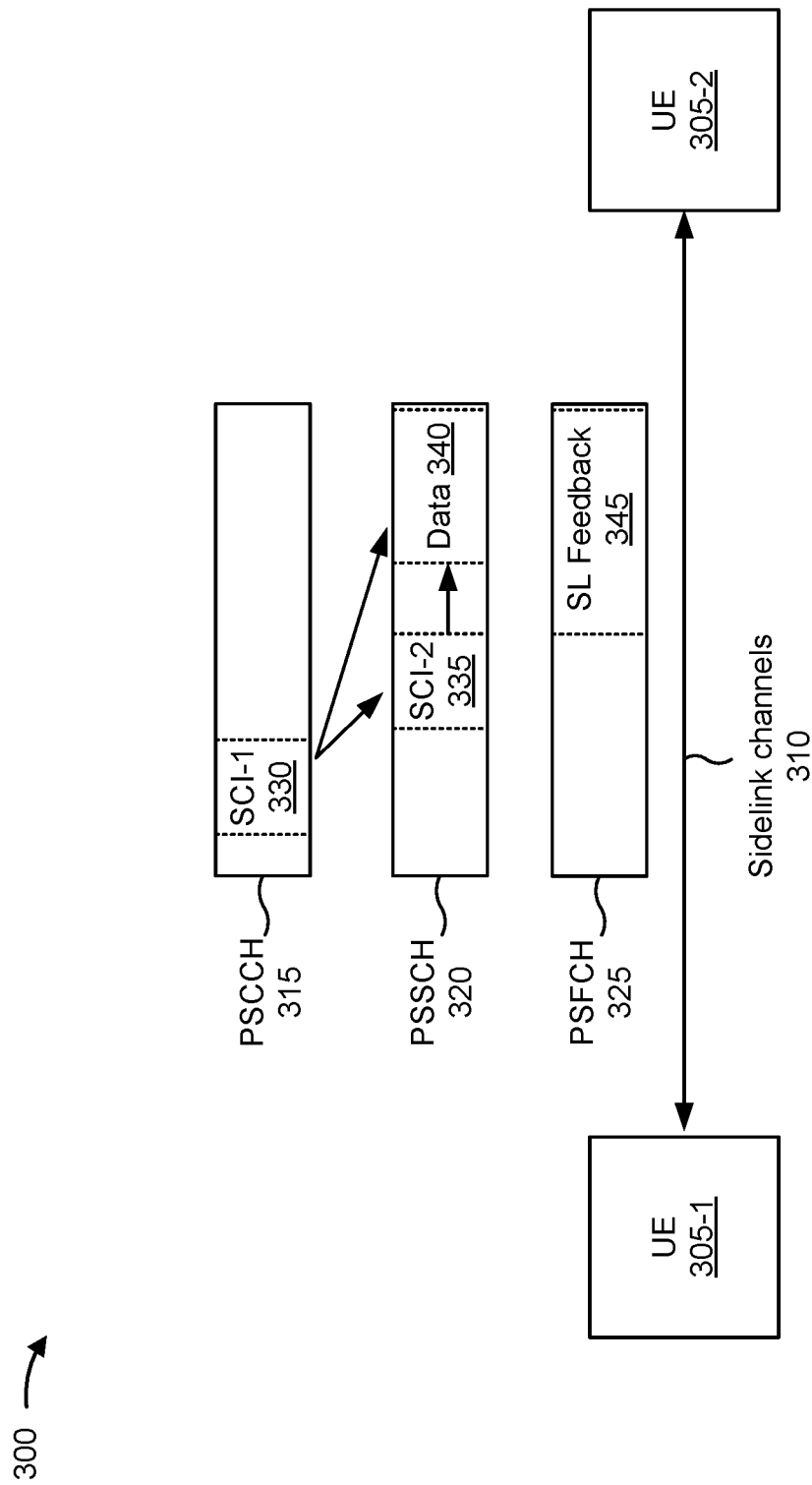
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface, may operate in a high frequency band (e.g., the 5.9 GHz band), may operate on an unlicensed or shared frequency band (e.g., an NR unlicensed (NR-U) frequency band), and/or the like. Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

The PSCCH 315 may carry sidelink control information part 1 (SCI-1) 330, which may indicate various control information used for sidelink communications. The control information may include an indication of one or more resources (e.g., time resources, frequency resources, spatial resources, and/or the like) where various types of information may be carried on the PSSCH 320, information for decoding sidelink communications on the PSSCH 320, a quality of service (QoS) priority value, a resource reservation period, a PSSCH demodulation reference signal (DMRS) pattern, a an SCI format and a beta offset for sidelink control information part 2 (SCI-2) 335 transmitted on the PSSCH 320, a quantity of PSSCH DMRS ports, a modulation coding scheme (MCS), and/or the like.

The information carried on the PSSCH 320 may include the SCI-2 335 and/or data 340. The SCI-2 335 may include various types of information, such as a hybrid automatic repeat request (HARQ) process ID, a new data indicator (NDI) associated with the data 340, a source identifier, a destination identifier, a channel state information (CSI) report trigger, and/or the like. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), a scheduling request (SR), and/or the like.

As indicated above, FIG. 3 is provided as an example. Other examples may differ from what is described with respect to FIG. 3.

Figure 4:
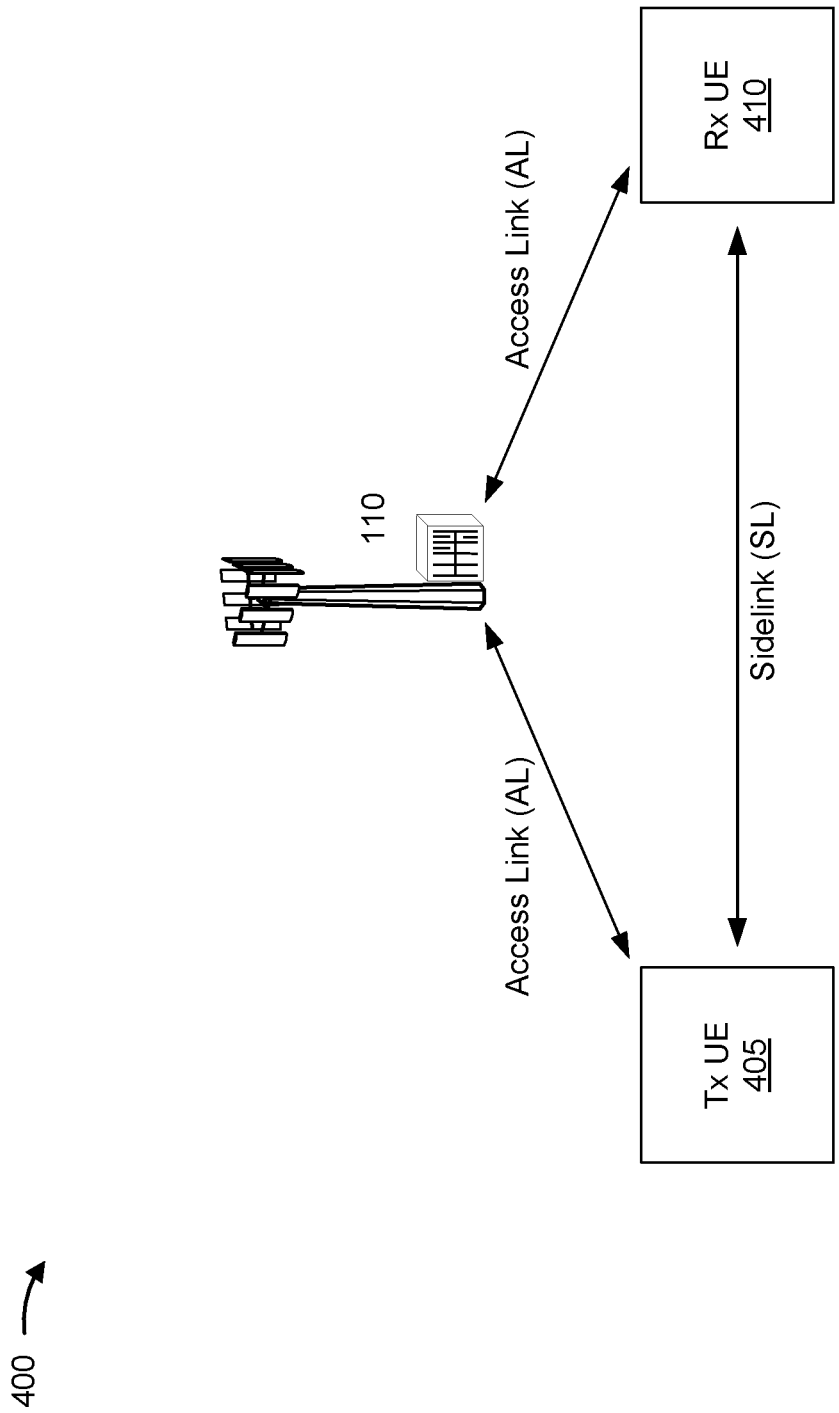
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the Tx UE 405 may operate in a resource allocation mode in which the base station 110 reserves and allocates sidelink resources for the Tx UE 405. This may be referred to as Mode 1 sidelink resource allocation. In some aspects, the Tx UE 405 may operate in a resource allocation mode in which sidelink resource selection and/or scheduling is performed by the Tx UE 405 (e.g., rather than the base station 110). This may be referred to as Mode 2 sidelink resource allocation.

In a Mode 1 sidelink resource allocation scheme, the base station 110 may transmit a sidelink grant to the Tx UE 405 via the access link. The sidelink grant may be a dynamic grant (e.g., received in a downlink control information (DCI) communication) or a semi-static/configured grant (e.g., received in a radio resource control (RRC) communication). For semi-static/configured grants, the base station 110 may activate a sidelink grant in the same RRC communication that configures the sidelink grant (referred to as a Type 1 configured grant) or may activate the sidelink grant in a DCI communication (referred to as a Type 2 configured grant).

As indicated above, FIG. 4 is provided as an example. Other examples may differ from what is described with respect to FIG. 4.

For Mode 1 sidelink resource allocation, a Tx UE may provide, to a base station, an indication of a buffer status report (BSR) (e.g., in a medium access control control element (MAC-CE) communication or another type of uplink communication). The BSR may indicate to the base station that the Tx UE has sidelink data to transmit to an Rx UE on a sidelink. The base station may receive the indication of the BSR, may configure a sidelink grant for the Tx UE, and may transmit an indication of the sidelink grant to the Tx UE. The Tx UE may receive the sidelink grant and may transmit, to the Rx UE, SCI-1 and SCI-2 associated with the sidelink data.

The Rx UE may receive the SCI-1 to identify the resource allocation of the SCI-2. The Rx UE may identify and decode the SCI-2 to determine if the destination identifier associated with the Rx UE is associated with any of the PSSCHs indicated in the SCI-2, which would indicate that the Tx UE is to transmit the sidelink data to the Rx UE. Thus, the Rx UE consumes processing resources, memory resources, and battery resources monitoring for and decoding the entire SCI-1 and the entire SCI-2 transmitted by the Tx UE, regardless of whether the Tx UE has sidelink data to transmit to the Rx UE. The consumption of processing resources, memory resources, and battery resources greatly increases as the quantity of Tx UEs communicatively connected with the Rx UE increases.

Some aspects described herein introduce a receive grant for a sidelink transmission. In some aspects, a Tx UE may transmit an indication of a BSR to a base station. The BSR may indicate that the Tx UE has sidelink data to transmit to an Rx UE. The base station may identify the Rx UE based at least in part on the BSR and may transmit a receive grant to the Rx UE. The receive grant may indicate that the Tx UE has sidelink data to transmit to the Rx UE, may indicate the sidelink resources in which the Tx UE is to transmit SCI-1 for the sidelink data, and/or the like. In this way, instead of monitoring for and decoding all of the SCI-1 and the SCI-2 transmitted to the Rx UE, the Rx UE may monitor for and decode only the SCI-1 and the SCI-2 for the sidelink data that is to be transmitted to the Rx UE. This reduces the processing resources, memory resources, and battery resources consumed by the Rx UE.

Figure 5:
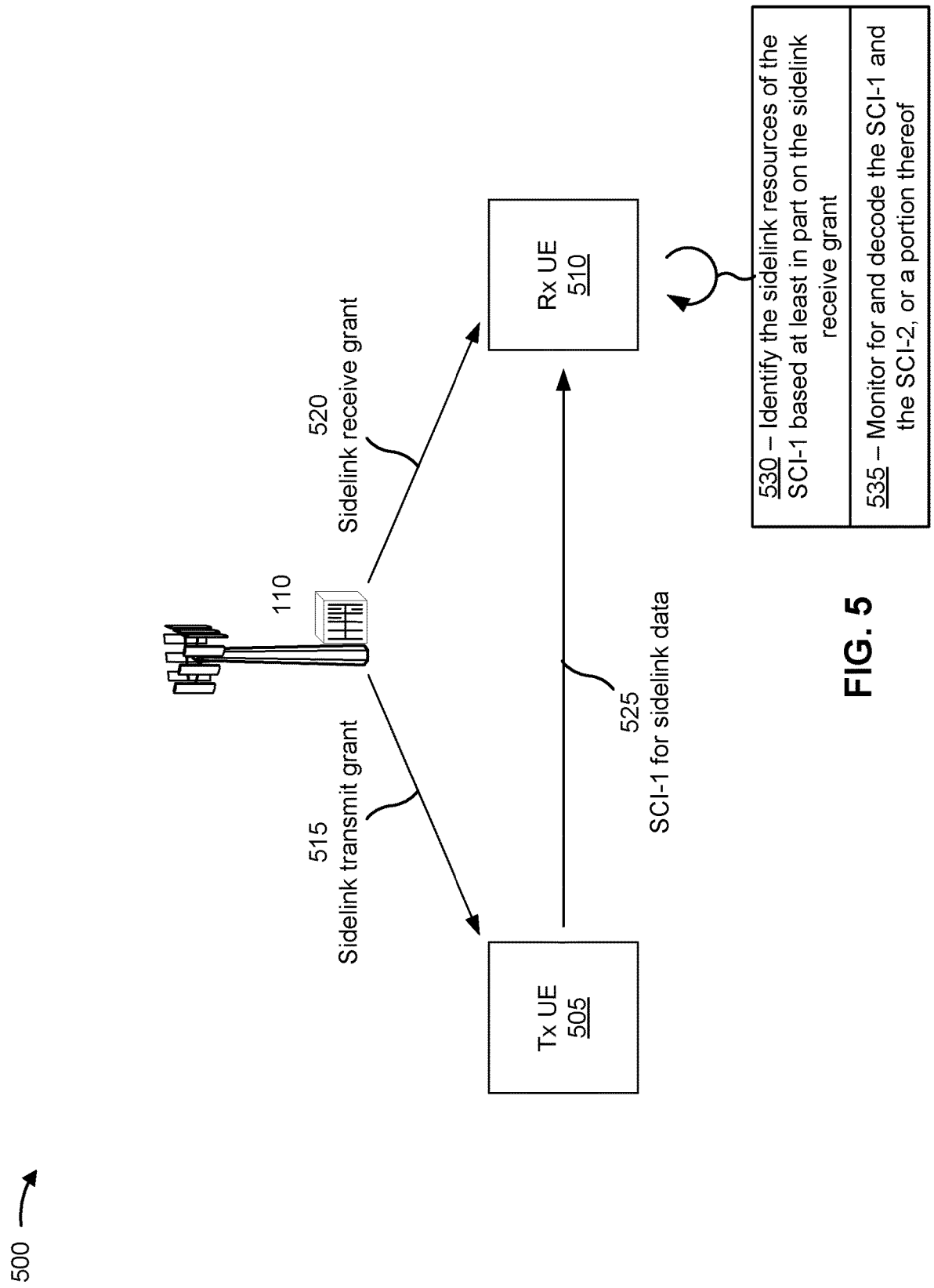
FIGS. 5 and 6 are diagrams illustrating examples associated with a receive grant for a sidelink transmission, in accordance with the present disclosure.

FIG. 5 is a diagram illustrating an example 500 associated with a receive grant for a sidelink transmission, in accordance with the present disclosure. As shown in FIG. 5, example 500 may include access link communication between a base station 110 and a plurality of UEs (e.g., UEs 120), such as a Tx UE 505 and an Rx UE 510. The Tx UE 505 may be a UE that is to transmit sidelink data on a sidelink to the Rx UE 510, and the Rx UE 510 is a UE that is to receive the sidelink data on the sidelink.

As shown in FIG. 5, and by reference number 515, the base station 110 may transmit a sidelink transmit grant to the Tx UE 505. The sidelink transmit grant may be a grant or an allocation of sidelink resources for transmitting the sidelink data to the Rx UE 510 on the sidelink. For example, the sidelink transmit grant may indicate one or more frequency domain resources and/or one or more time domain resources for transmitting the sidelink data to the Rx UE 510 on a PSSCH.

In some aspects, the sidelink transmit grant may be transmitted according to Mode 1 sidelink resource allocation. In these cases, the Tx UE 505 may transmit an indication of a BSR to the base station 110, and the base station 110 may schedule or allocate the sidelink resources for transmission of the sidelink data based at least in part on the BSR. In some aspects, the sidelink transmit grant is a dynamic grant that is transmitted in a DCI communication. In some aspects, the sidelink transmit grant is a configured grant that is transmitted in an RRC communication, and activated by the RRC communication (e.g., a Type 1 configured grant) or activated by a DCI communication (e.g., a Type 2 configured grant).

In some aspects, if the base station 110 transmits the sidelink transmit grant to the Tx UE 505 in a DCI communication, the DCI communication may have a DCI format 3_0 communication or another DCI format for scheduling sidelink communications for one or more UEs. The sidelink transmit grant may include various parameters or fields for the Tx UE 505, the sidelink data, and/or for SCI-1 associated with the sidelink data. The parameters or fields may include, for example, a time gap relative to a first slot in a sidelink resource pool associated with the Tx UE 505 for the SCI-1, a HARQ process identifier associated with the DCI communication, a new data indicator associated with the sidelink data, an index of a subchannel allocation for the SCI-1, a frequency domain resource allocation (e.g., an allocation of frequency domain resources, such as one or more resource blocks, one or more resource elements, one or more subcarriers, one or more component carriers, and/or the like) associated with the SCI-1, a time domain resource allocation (e.g., an allocation of time domain resources, such as one or more symbols, one or more slots, one or more subframes, and/or the like) associated with the SCI-1, a PSFCH to HARQ feedback timing indication (e.g., an indication of a timing between a last symbol for receiving feedback on a PSFCH for the sidelink data and providing HARQ feedback to the base station 110 for the DCI communication), a PUCCH resource indicator for the HARQ feedback, and/or the like.

As further shown in FIG. 5, and by reference number 520, the base station 110 may configure and transmit a sidelink receive grant to the Rx UE 510. The sidelink receive grant may be an indication that another UE (e.g., Tx UE 505) is to transmit sidelink data to the Rx UE 510. In some aspects, the base station 110 may configure and transmit the sidelink receive grant to the Rx UE 510 based at least in part on receiving the BSR from the Tx UE 505. For example, the BSR may identify the Rx UE 510 as a destination of sidelink data that is to be transmitted by the Tx UE 505. Accordingly, the base station 110 may determine, based at least in part on an indication of the Rx UE 510 in the BSR, that Tx UE 505 is to transmit the sidelink data to the Rx UE 510, and may transmit the sidelink receive grant to the Rx UE 510 based at least in part on the determination.

In some aspects, the base station 110 transmits the sidelink receive grant to the Rx UE 510 in a downlink communication. In some aspects, if the downlink communication is a DCI communication, the DCI communication may have a DCI format 3_0 communication or another DCI format for scheduling sidelink communications for one or more UEs. The base station 110 may configure the sidelink receive grant to include various parameters or fields for the Rx UE 505, the sidelink data, and/or for the SCI-1 associated with the sidelink data. The parameters or fields may include, for example, a time gap relative to a first slot in a sidelink resource pool associated with the Tx UE 505 and the Rx UE 510 for the SCI-1, a HARQ process identifier associated with the DCI communication, a new data indicator associated with the sidelink data, an index of a subchannel allocation for the SCI-1, a frequency domain resource allocation associated with the SCI-1, a time domain resource allocation associated with the SCI-1, a PSSCH to HARQ feedback timing indication (e.g., an indication of a timing between a last symbol of the PSSCH carrying the sidelink data and providing HARQ feedback to the base station 110 for the DCI communication), a PUCCH resource indicator for the HARQ feedback, and/or the like. The sidelink receive grant may also include a sidelink transmission configuration indicator (TCI) state associated with the Rx UE 510 to indicate a beam configuration for the Rx UE 510.

In some aspects, the base station 110 may configure the sidelink receive grant to be associated with a sidelink Rx radio network temporary identifier (SL-Rx-RNTI) or another type of identifier that can be used to distinguish between sidelink receive grants and sidelink transmit grants. In these cases, the Rx UE 510 may determine that the sidelink grant included in the DCI communication is a sidelink receive grant based at least in part on the DCI communication being scrambled based at least in part on or otherwise associated with the SL-Rx-RNTI. In some aspects, the Rx UE 510 may determine that the sidelink grant included in the DCI communication is a sidelink receive grant based at least in part on the sidelink receive grant being associated with a combination of a SL-Rx-RNTI and a sidelink radio network temporary identifier (SL-RNTI) associated with the Tx UE 505 and the Rx UE 510. In some aspects, if an SL-Rx-RNTI is not used, the base station 110 may configure an additional parameter or field in the sidelink receive grant to include a receive grant indicator or another type of indication that the DCI communication includes a sidelink receive grant (e.g., as opposed to a sidelink transmit grant).

As further shown in FIG. 5, and by reference number 525, the Tx UE 505 may transmit the SCI-1 for the sidelink data. In particular, the Tx UE 505 may transmit the SCI-1 in the frequency domain resources and/or the time domain resources indicated in the sidelink transmit grant. As further shown in in FIG. 5, and by reference number 530, the Rx UE 510 may receive the sidelink receive grant from the base station 110, and may identify the sidelink resources (e.g., the frequency domain resources and/or the time domain resources) for the SCI-1 indicated in the sidelink receive grant.

As further shown in FIG. 5, and by reference number 535, the Rx UE 510 may monitor the sidelink resources for the SCI-1, may receive the SCI-1 in the sidelink resources based at least in part on monitoring the sidelink resources, and may decode the SCI-1 based at least in part on receiving the SCI-1. In some aspects, to conserve processing resources, memory resource, and/or battery resources, the Rx UE 510 monitors for a portion of the SCI-1 that is transmitted in the one or more sidelink resources (e.g., the portion that is directed to the Rx UE 510), and refrains from monitoring other portions of the SCI that is transmitted in one or more other sidelink resources. In some aspects, to conserve processing resources, memory resources, and/or battery resources, the Rx UE 510 monitors only the sidelink resources indicated in the sidelink receive grant, and refrains from monitoring for other SCI-1 transmitted in other sidelink resources. In some aspects, the Rx UE 510 monitors the sidelink resources indicated in the sidelink receive grant as well as other sidelink resources for other SCI-1.

The Rx UE 510 may identify, in the SCI-1, information associated with SCI-2 and with the sidelink data to be transmitted to the Rx UE 510. The information may include for example, an indication of PSSCH resources (e.g., time domain resources, frequency domain resources, and/or the like) in which the SCI-2 and/or the sidelink data is to be transmitted, an SCI format for the SCI-2, a beta offset for the SCI-2, and/or the like. The Rx UE 510 may monitor for and decode the SCI-2 based at least in part on the information included in the SCI-1 to determine which PSSCH is associated with the Rx UE 510 to receive the sidelink data.

In this way, the base station 110 may identify the Rx UE 510 based at least in part on the BSR received from the Tx UE 505, and may transmit the sidelink receive grant to the Rx UE 510. The sidelink receive grant may indicate that the Tx UE 505 has sidelink data to transmit to the Rx UE 510, may indicate the sidelink resources in which the Tx UE 505 is to transmit the SCI-1 for the sidelink data, and/or the like. In this way, instead of monitoring for and decoding all of the SCI-1 and the SCI-2 transmitted to the Rx UE 510, the Rx UE 510 may monitor for and decode only the SCI-1 and the SCI-2 for the sidelink data that is to be transmitted to the Rx UE 510. This reduces the processing resources, memory resources, and battery resources consumed by the Rx UE 510.

As indicated above, FIG. 5 is provided as an example. Other examples may differ from what is described with respect to FIG. 5.

Figure 6:
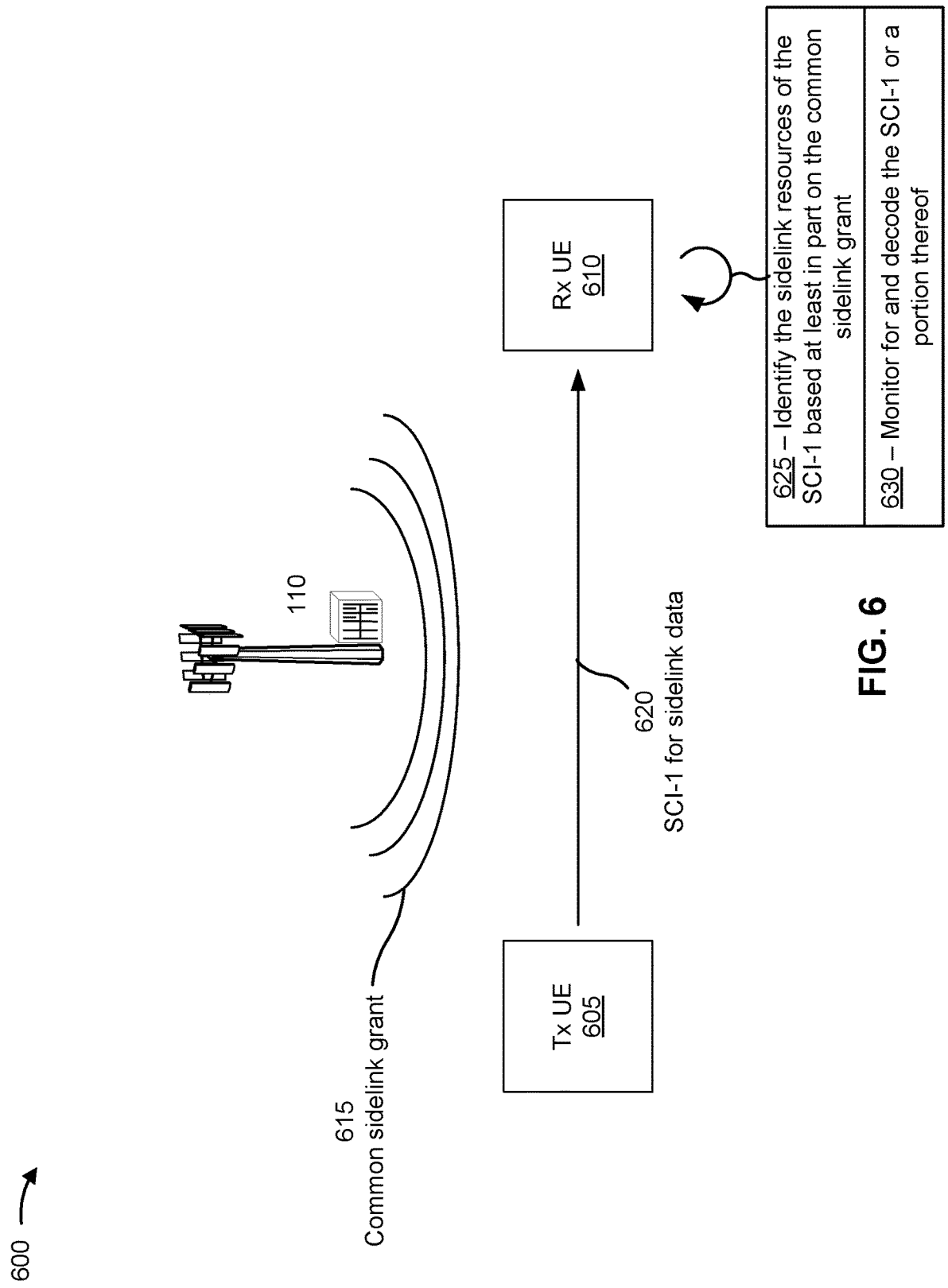

FIG. 6 is a diagram illustrating an example 600 associated with a receive grant for a sidelink transmission, in accordance with the present disclosure. As shown in FIG. 6, example 600 may include access link communication between a base station 110 and a plurality of UEs (e.g., UEs 120), such as a Tx UE 605 and an Rx UE 610. The Tx UE 605 may be a UE that is to transmit sidelink data on a sidelink to the Rx UE 610, and the Rx UE 610 is a UE that is to receive the sidelink data on the sidelink.

As shown in FIG. 6, and by reference number 615, the base station 110 may transmit a common sidelink grant to the Tx UE 605 and the Rx UE 610. The common sidelink grant may be a sidelink grant or an allocation of sidelink resources for the Tx UE 605 to transmit the sidelink data to the Rx UE 610 on the sidelink. The common sidelink grant may be a single sidelink grant that includes the information, parameters, and/or fields described above in connection with FIG. 5 for the sidelink transmit grant, and the information, parameters, and/or fields described above in connection with FIG. 5 for the sidelink receive grant, a subset thereof, and/or other information, parameters, and/or fields.

In some aspects, the common sidelink grant may be transmitted according to Mode 1 sidelink resource allocation. In these cases, the Tx UE 605 may transmit an indication of a BSR to the base station 110, and the base station 110 may schedule or allocate the sidelink resources for transmission of the sidelink data based at least in part on the BSR. In some aspects, the common sidelink grant is a dynamic grant that is transmitted in a DCI communication. In some aspects, the common sidelink grant is a configured grant that is transmitted in an RRC communication, and activated by the RRC communication (e.g., a Type 1 configured grant) or activated by a DCI communication (e.g., a Type 2 configured grant).

In some aspects, the base station 110 may transmit a single common sidelink grant to the Tx UE 605 and the Rx UE 610 where the base station 110 communicates with the Tx UE 605 and the Rx UE 610 using the same transmit beam. In some aspects, the base station 110 may transmit a single common sidelink grant to the Tx UE 605 and the Rx UE 610 by broadcasting, groupcasting, or multicasting a single transmission of the common sidelink grant to the Tx UE 605 and the Rx UE 610.

In some aspects, if the base station 110 transmits the common sidelink grant to the Tx UE 605 and the Rx UE 610 in a DCI communication. The DCI communication may have a DCI format 3_0 communication or another DCI format for scheduling sidelink communications for one or more UEs. The common sidelink grant may include various parameters or fields for the Tx UE 605, the Rx UE 610, the sidelink data, and/or for SCI-1 associated with the sidelink data. The parameters or fields may include, for example, a time gap relative to a first slot in a sidelink resource pool associated with the Tx UE 605 for the SCI-1, a HARQ process identifier associated with the DCI communication, a new data indicator associated with the sidelink data, an index of a subchannel allocation for the SCI-1, a frequency domain resource allocation (e.g., an allocation of frequency domain resources, such as one or more resource blocks, one or more resource elements, one or more subcarriers, one or more component carriers, and/or the like) associated with the SCI-1, a time domain resource allocation (e.g., an allocation of time domain resources, such as one or more symbols, one or more slots, one or more subframes, and/or the like) associated with the SCI-1, a PSFCH to HARQ feedback timing indication (e.g., an indication of a timing between a last symbol for the Tx UE 605 to receive feedback on a PSFCH for the sidelink data and to provide HARQ feedback to the base station 110 for the DCI communication), a PUCCH resource indicator for the Tx UE 605 to provide HARQ feedback, a PSSCH to HARQ feedback timing indication (e.g., an indication of a timing between a last symbol for the Rx UE 610 to receive the PSSCH carrying the sidelink data and to provide HARQ feedback to the base station 110 for the DCI communication), a PUCCH resource indicator for the Rx UE 610 to provide the HARQ feedback, a TCI state associated with the Rx UE 610 to indicate a beam configuration for the Rx UE 610, and/or the like.

The common sidelink grant may further include one or more parameters or fields including information identifying a source identifier and a destination identifier associated with the common sidelink grant. The source identifier may be associated with the Tx UE 605 and may indicate that the Tx UE 605 is the transmitter of the sidelink data associated with the common sidelink grant. The destination identifier may be associated with the Rx UE 610 and may indicate that the Rx UE 610 is the receiver of the sidelink data associated with the common sidelink grant.

In some aspects, the base station 110 may configure the common sidelink grant to be associated with a sidelink link-specific radio network temporary identifier (SL-Link-RNTI) or another type of identifier that is associated with the Tx UE 605 and the Rx UE 610 and/or the sidelink between the Tx UE 605 and the Rx UE 610. The SL-Link-RNTI may be indicated to the Tx UE 605 and the Rx UE 610 through RRC signaling from the base station 110. In these cases, the Tx UE 605 and the Rx UE 610 may determine that the common sidelink grant included in the DCI communication is for the Tx UE 605 and the Rx UE 610 based at least in part on the DCI communication being scrambled based at least in part on or otherwise associated with the SL-Link-RNTI.

In scenarios where the Tx UE 605 is to groupcast the sidelink data to a group of UEs that includes the Rx UE 610, the base station 110 may configure the common sidelink grant to be associated with a sidelink group radio network temporary identifier (SL-G-RNTI) associated with the group of UEs. In these examples, the SL-G-RNTI may be indicated to Rx UE 610 and the other UEs in the group through RRC signaling from the base station 110. The Rx UE 610 and the other UEs in the group may determine that the common sidelink grant included in the DCI communication is for the group of UEs based at least in part on the DCI communication being scrambled based at least in part on or otherwise associated with the SL-G-RNTI. The base station 110 may further configure the common sidelink grant to include one or more parameters or fields indicating respective pairs of a sidelink destination identifier and a TCI state for each UE in the group of UEs.

As further shown in FIG. 6, and by reference number 620, the Tx UE 605 may transmit the SCI-1 for the sidelink data. In particular, the Tx UE 605 may transmit the SCI-1 in the frequency domain resources and/or the time domain resources indicated in the common sidelink grant. As further shown in in FIG. 6, and by reference number 625, the Rx UE 610 may receive the common sidelink grant from the base station 110, and may identify the sidelink resources (e.g., the frequency domain resources and/or the time domain resources) for the SCI-1 indicated in the sidelink receive grant.

As further shown in FIG. 6, and by reference number 630, the Rx UE 610 may monitor the sidelink resources for the SCI-1, may receive the SCI-1 in the sidelink resources based at least in part on monitoring the sidelink resources, and may decode the SCI-1 based at least in part on receiving the SCI-1. In some aspects, to conserve processing resources, memory resources, and/or battery resources, the Rx UE 610 monitors for a portion of the SCI-1 that is transmitted in the one or more sidelink resources (e.g., the portion that is directed to the Rx UE 610), and refrains from monitoring other portions of the SCI that are transmitted in one or more other sidelink resources. In some aspects, to conserve processing resources, memory resources, and/or battery resources, the Rx UE 610 monitors only the sidelink resources indicated in the common sidelink grant, and refrains from monitoring for other SCI-1 transmitted in other sidelink resources. In some aspects, the Rx UE 610 monitors the sidelink resources indicated in the common sidelink grant as well as other sidelink resources for other SCI-1.

The Rx UE 610 may identify, in the SCI-1, information associated with SCI-2 and with the sidelink data to be transmitted to the Rx UE 610. The information may include for example, an indication of PSSCH resources (e.g., time domain resources, frequency domain resources, and/or the like) in which the SCI-2 and/or the sidelink data is to be transmitted, an SCI format for the SCI-2, a beta offset for the SCI-2, and/or the like. The Rx UE 610 may monitor for and decode the SCI-2 based at least in part on the information included in the SCI-1 to determine which PSSCH is associated with the Rx UE 610 to receive the sidelink data.

In this way, the base station 110 may identify the Rx UE 610 based at least in part on the B SR received from the Tx UE 605, and may transmit the sidelink receive grant to the Rx UE 610. The sidelink receive grant may indicate that the Tx UE 605 has sidelink data to transmit to the Rx UE 610, may indicate the sidelink resources in which the Tx UE 605 is to transmit the SCI-1 for the sidelink data, and/or the like. In this way, instead of monitoring for and decoding all of the SCI-1 and the SCI-2 transmitted to the Rx UE 610, the Rx UE 610 may monitor for and decode only the SCI-1 and the SCI-2 for the sidelink data that is to be transmitted to the Rx UE 610. This reduces the processing resources, memory resources, and battery resources consumed by the Rx UE 610.

As indicated above, FIG. 6 is provided as an example. Other examples may differ from what is described with respect to FIG. 6.

Figure 7:
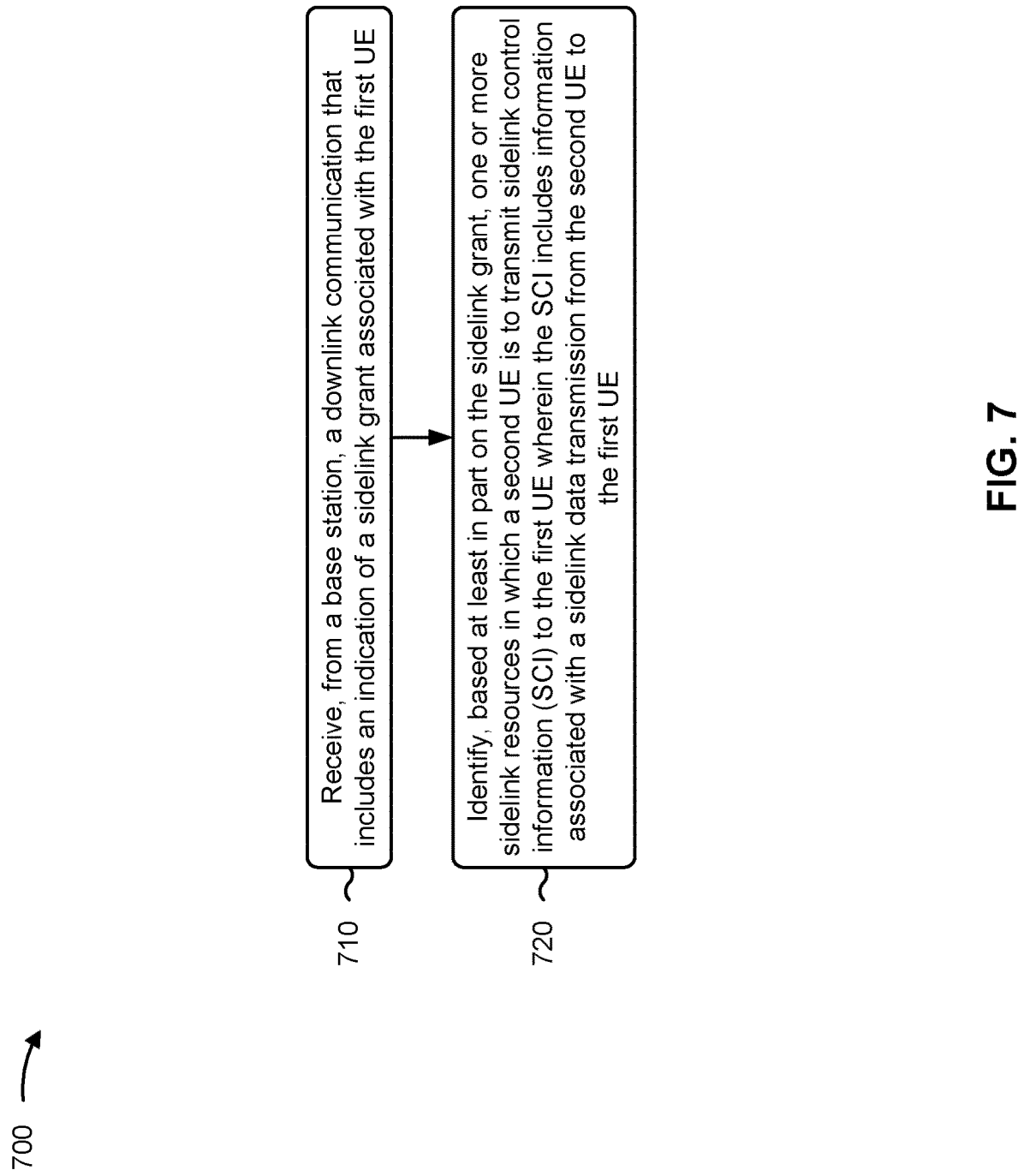
FIGS. 7 and 8 are diagrams illustrating example processes associated with a receive grant for a sidelink transmission, in accordance with the present disclosure.

FIG. 7 is a diagram illustrating an example process 700 performed, for example, by a first UE, in accordance with the present disclosure. Example process 700 is an example where the first UE (e.g., UE 120, UE 305, Rx UE 410, Rx UE 510, Rx UE 610, and/or the like) performs operations associated with a receive grant for a sidelink transmission.

As shown in FIG. 7, in some aspects, process 700 may include receiving, from a base station, a downlink communication that includes an indication of a sidelink grant associated with the first UE (block 710). For example, the first UE (e.g., using receive processor 258, transmit processor 264, controller/processor 280, memory 282, and/or the like) may receive, from a base station, a downlink communication that includes an indication of a sidelink grant associated with the first UE, as described above.

As further shown in FIG. 7, in some aspects, process 700 may include identifying, based at least in part on the sidelink grant, one or more sidelink resources in which a second UE is to transmit SCI to the first UE, wherein the SCI includes information associated with a sidelink data transmission from the second UE to the first UE (block 720). For example, the UE (e.g., using receive processor 258, transmit processor 264, controller/processor 280, memory 282, and/or the like) may identify, based at least in part on the sidelink grant, one or more sidelink resources in which a second UE is to transmit SCI to the first UE, as described above. In some aspects, the SCI includes information associated with a sidelink data transmission from the second UE to the first UE.

Process 700 may include additional aspects, such as any single aspect or any combination of aspects described below and/or in connection with one or more other processes described elsewhere herein.

In a first aspect, the downlink communication is a DCI format 3_0 communication, and the sidelink grant is a receive grant for the first UE. In a second aspect, alone or in combination with the first aspect, the sidelink grant is associated with an SL-RNTI associated with the first UE and the second UE, and the downlink communication includes a field indicating that the sidelink grant is for the first UE. In a third aspect, alone or in combination with one or more of the first and second aspects, the sidelink grant is associated with an SL-RNTI associated with the first UE and the second UE and an SL-Rx-RNTI associated with the first UE, and process 700 includes determining that the sidelink grant is for the first UE based at least in part on determining that the sidelink grant is associated with the SL-Rx-RNTI and the SL-RNTI. In a fourth aspect, alone or in combination with one or more of the first through third aspects, the sidelink grant includes one or more fields indicating at least one of a time gap, relative to a first slot in a sidelink resource pool associated with the first UE and the second UE, for the SCI, a HARQ process identifier associated with the downlink communication, a new data indicator, an index of a subchannel allocation for the SCI, a frequency domain resource allocation associated with the SCI, a time domain resource allocation associated with the SCI, a PSSCH to HARQ feedback timing indication, a PUCCH resource indicator for HARQ feedback associated with the downlink communication, a receive grant indicator, or a TCI state associated with the first UE.

In a fifth aspect, alone or in combination with one or more of the first through fourth aspects, process 700 includes monitoring a portion of the SCI that is transmitted in the one or more sidelink resources and refraining from monitoring other portions of the SCI that is transmitted in one or more other sidelink resources. In a sixth aspect, alone or in combination with one or more of the first through fifth aspects, process 700 includes monitoring a portion of the SCI that is transmitted in the one or more sidelink resources and monitoring other portions of the SCI that is transmitted in one or more other sidelink resources.

In a seventh aspect, alone or in combination with one or more of the first through sixth aspects, the sidelink grant is a common sidelink grant that is associated with the first UE and the second UE. In an eighth aspect, alone or in combination with one or more of the first through seventh aspects, the downlink communication is a DCI communication that is broadcasted to the first UE and the second UE. In a ninth aspect, alone or in combination with one or more of the first through eighth aspects, the downlink communication is associated with an SL-Link-RNTI associated with the first UE and the second UE.

In a tenth aspect, alone or in combination with one or more of the first through ninth aspects, the downlink communication is associated with an SL-G-RNTI associated with the first UE and one or more third UEs, the first UE and the one or more third UEs are included in a group of UEs to which the second UE is to groupcast the sidelink data transmission. In an eleventh aspect, alone or in combination with one or more of the first through tenth aspects, the sidelink grant includes one or more fields indicating at least one of respective sidelink destination identifiers associated with each of the first UE and the one or more third UEs or a sidelink TCI associated with each of the first UE and the one or more third UEs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
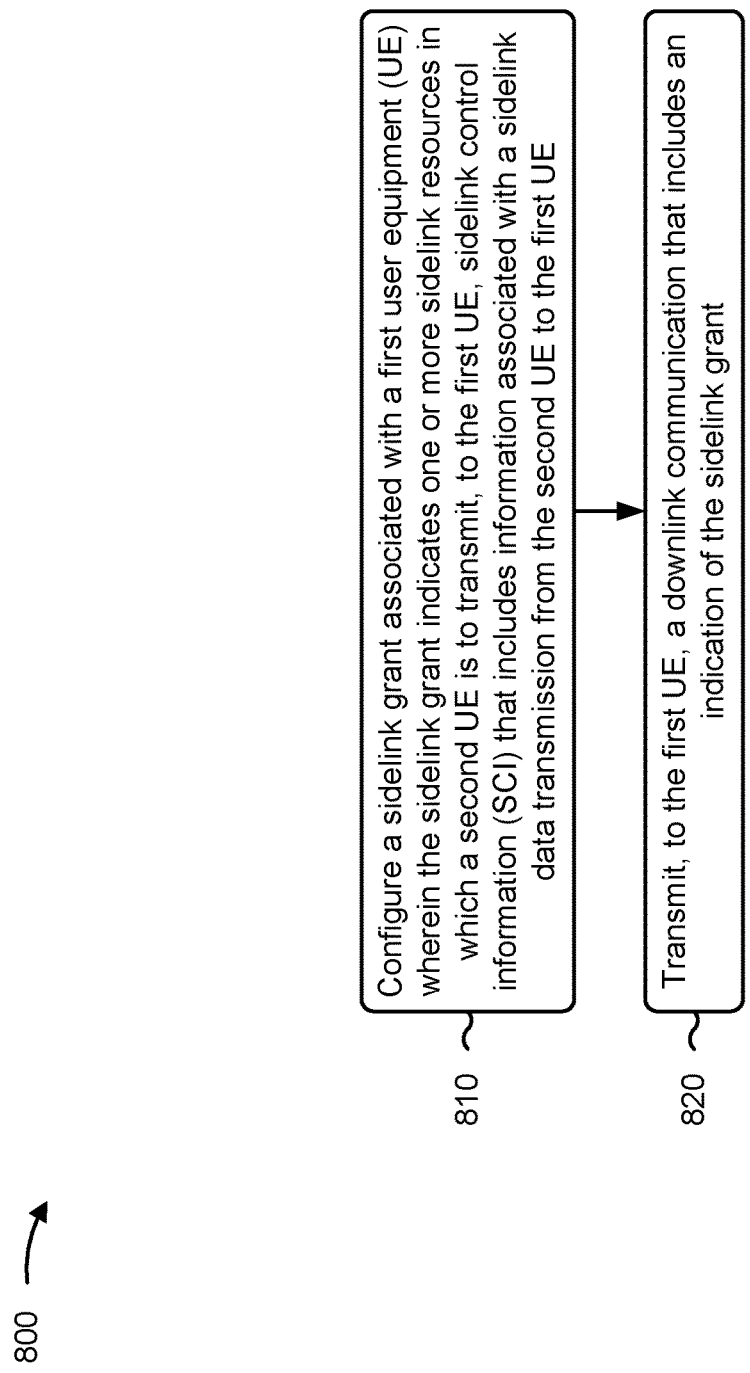

FIG. 8 is a diagram illustrating an example process 800 performed, for example, by a base station, in accordance with the present disclosure. Example process 800 is an example where the base station (e.g., base station 110 and/or the like) performs operations associated with receive grant for a sidelink transmission.

As shown in FIG. 8, in some aspects, process 800 may include configuring a sidelink grant associated with a first UE, wherein the sidelink grant indicates one or more sidelink resources in which a second UE is to transmit, to the first UE, SCI that includes information associated with a sidelink data transmission from the second UE to the first UE (block 810). For example, the base station (e.g., using transmit processor 220, receive processor 238, controller/processor 240, memory 242, and/or the like) may configure a sidelink grant associated with a UE, as described above. In some aspects, the sidelink grant indicates one or more sidelink resources in which a second UE is to transmit, to the first UE, SCI that includes information associated with a sidelink data transmission from the second UE to the first UE.

As further shown in FIG. 8, in some aspects, process 800 may include transmitting, to the first UE, a downlink communication that includes an indication of the sidelink grant (block 820). For example, the base station (e.g., using transmit processor 220, receive processor 238, controller/processor 240, memory 242, and/or the like) may transmit, to the first UE, a downlink communication that includes an indication of the sidelink grant, as described above.

Process 800 may include additional aspects, such as any single aspect or any combination of aspects described below and/or in connection with one or more other processes described elsewhere herein.

In a first aspect, the downlink communication is a DCI format 3_0 communication, and the sidelink grant is a receive grant for the first UE. In a second aspect, alone or in combination with the first aspect, the sidelink grant is associated with an SL-RNTI associated with the first UE and the second UE, and the downlink communication includes a field indicating that the sidelink grant is for the first UE. In a third aspect, alone or in combination with one or more of the first and second aspects, the sidelink grant is associated with an SL-RNTI associated with the first UE and the second UE and an SL-Rx-RNTI associated with the first UE.

In a fourth aspect, alone or in combination with one or more of the first through third aspects, the sidelink grant includes one or more fields indicating at least one of a time gap, relative to a first slot in a sidelink resource pool associated with the first UE and the second UE, for the SCI, a HARQ process identifier associated with the downlink communication, a new data indicator, an index of a sub-channel allocation for the SCI, a frequency domain resource allocation associated with the SCI, a time domain resource allocation associated with the SCI, a PSSCH to HARQ feedback timing indication, a PUCCH resource indicator for HARQ feedback associated with the downlink communication, a receive grant indicator, or a sidelink TCI state associated with the first UE. In a fifth aspect, alone or in combination with one or more of the first through fourth aspects, the sidelink grant is a common sidelink grant that is associated with the first UE and the second UE.

In a sixth aspect, alone or in combination with one or more of the first through fifth aspects, the downlink communication is a DCI communication, and transmitting the downlink communication includes broadcasting the DCI communication to the first UE and the second UE. In a seventh aspect, alone or in combination with one or more of the first through sixth aspects, the downlink communication is associated with an SL-Link-RNTI associated with the first UE and the second UE.

In an eighth aspect, alone or in combination with one or more of the first through seventh aspects, the downlink communication is associated with an SL-G-RNTI associated with the first UE and one or more third UEs, the first UE and the one or more third UEs are included in a group of UEs to which the second UE is to groupcast the sidelink data transmission. In a ninth aspect, alone or in combination with one or more of the first through eighth aspects, the sidelink grant includes one or more fields indicating at least one of respective sidelink destination identifiers associated with each of the first UE and the one or more third UEs, or a sidelink TCI associated with each of the first UE and the one or more third UEs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
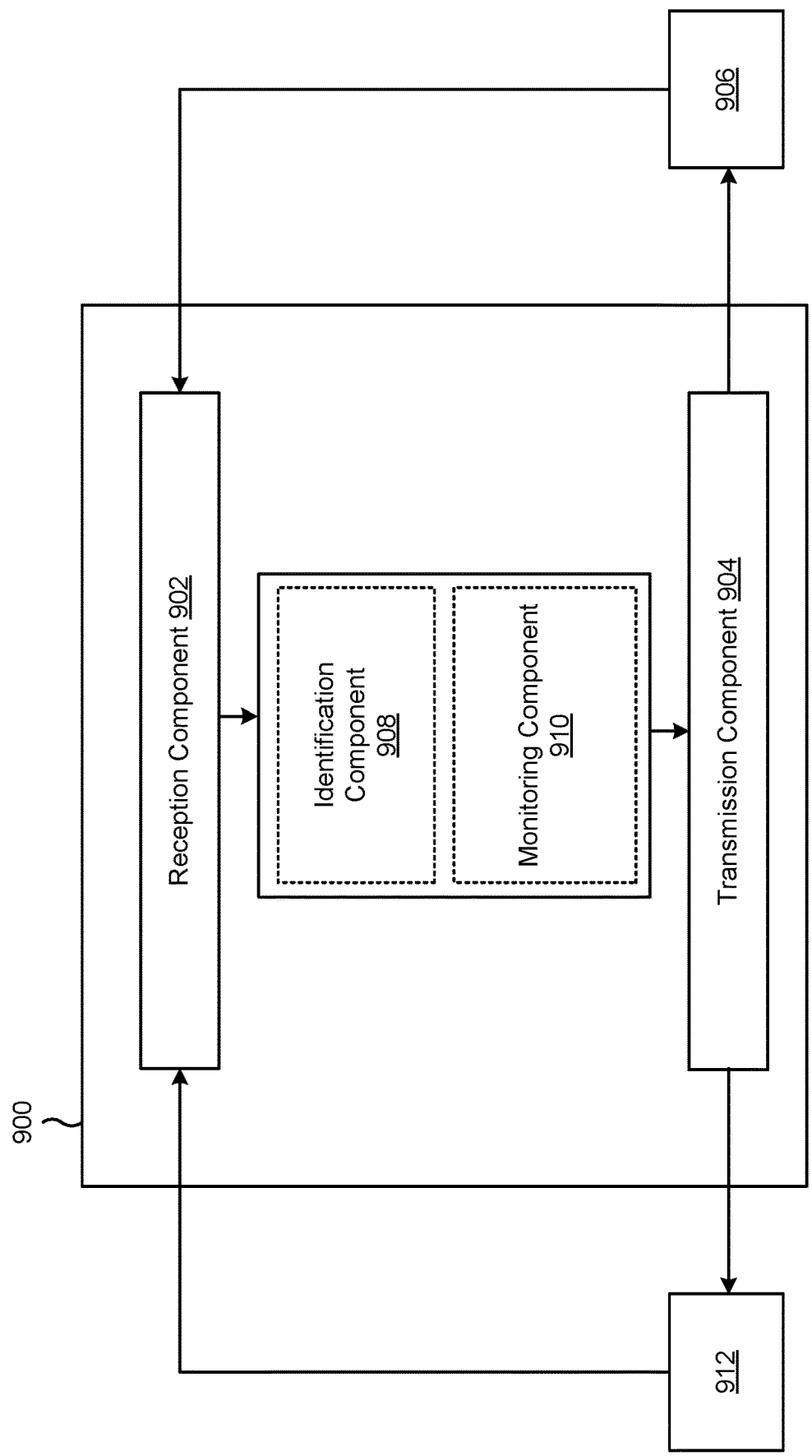
FIGS. 9 and 10 are diagrams of example apparatuses for wireless communication, in accordance with the present disclosure.

FIG. 9 is a block diagram of an example apparatus 900 for wireless communication. The apparatus 900 may be a UE (e.g., UE 120, UE 305, Rx UE 410, Rx UE 510, Rx UE 610, and/or the like), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with one or more other apparatuses 906 and 912 (such as a UE, a base station, or another wireless communication device) using the reception component 902 and the transmission component 904. As further shown, the apparatus 900 may include one or more of an identification component 908 and a monitoring component 910, among other examples.

In some aspects, the apparatus 900 may be configured to perform one or more operations described herein in connection with FIGS. 3-6. Additionally or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906 and/or the apparatus 912. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906 and/or the apparatus 912. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906 and/or the apparatus 912. In some aspects, one or more other components of the apparatus 906 and/or the apparatus 912 may generate communications and may provide the generated communications to the transmission component 904 for transmission to the apparatus 906 and/or the apparatus 912. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906 and/or the apparatus 912. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from the apparatus 906, a downlink communication that includes an indication of a sidelink grant associated with the apparatus 900. The identification component 908 may identify, based at least in part on the sidelink grant, one or more sidelink resources in which the apparatus 912 is to transmit SCI to the apparatus 900. The SCI may include information associated with a sidelink data transmission from the apparatus 912 to the apparatus 900. In some aspects, the monitoring component 910 may monitor a portion of the SCI that is transmitted in the one or more sidelink resources, and may refrain from monitoring other portions of the SCI that is transmitted in one or more other sidelink resources. In some aspects, the monitoring component 910 may monitor a portion of the SCI that is transmitted in the one or more sidelink resources and may monitor other portions of the SCI that is transmitted in one or more other sidelink resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
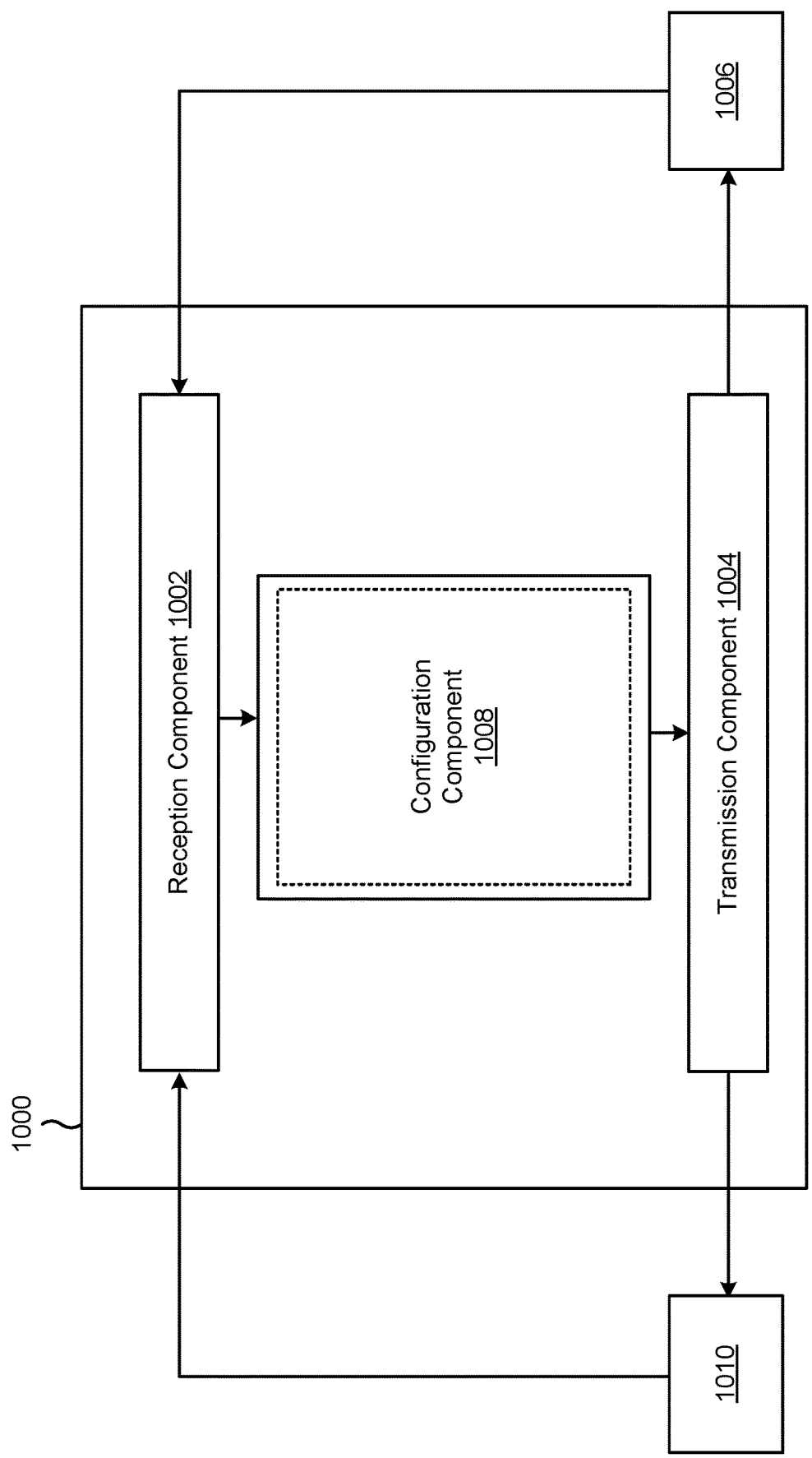

FIG. 10 is a block diagram of an example apparatus 1000 for wireless communication. The apparatus 1000 may be a base station (e.g., a base station 110), or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with other apparatuses 1006 and 1010 (such as a UE, a base station, or another wireless communication device) using the reception component 1002 and the transmission component 1004. As further shown, the apparatus 1000 may include one or more of a configuration component 1008, among other examples.

In some aspects, the apparatus 1000 may be configured to perform one or more operations described herein in connection with FIGS. 3-6. Additionally or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006 and/or the apparatus 1010. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006 and/or the apparatus 1010. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006 and/or the apparatus 1010. In some aspects, one or more other components of the apparatus 1006 and/or the apparatus 1010 may generate communications and may provide the generated communications to the transmission component 1004 for transmission to the apparatus 1006 and/or the apparatus 1010. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006 and/or the apparatus 1010. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The configuration component 1008 may configure a sidelink grant associated with the apparatus 1006. The sidelink grant may indicate one or more sidelink resources in which the apparatus 1010 is to transmit, to the apparatus 1006, SCI that includes information associated with a sidelink data transmission from the apparatus 1010 to the apparatus 1006. The transmission component 1004 may transmit, to the apparatus 1006, a downlink communication that includes an indication of the sidelink grant.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first user equipment (UE), comprising: receiving, from a base station, a downlink communication that includes an indication of a sidelink grant associated with the first UE; and identifying, based at least in part on the sidelink grant, one or more sidelink resources in which a second UE is to transmit sidelink control information (SCI) to the first UE, wherein the SCI includes information associated with a sidelink data transmission from the second UE to the first UE.

Aspect 2: The method of Aspect 1, wherein the downlink communication is a downlink control information (DCI) format 3_0 communication; and wherein the sidelink grant is a receive grant for the first UE. Aspect 3: The method of Aspect 1 or 2, wherein the sidelink grant is associated with a sidelink radio network temporary identifier (SL-RNTI) associated with the first UE and the second UE; and wherein the downlink communication includes a field indicating that the sidelink grant is for the first UE.

Aspect 4: The method of Aspect 1 or 2, wherein the sidelink grant is associated with: a sidelink radio network temporary identifier (SL-RNTI) associated with the first UE and the second UE, and a sidelink receive radio network temporary identifier (SL-Rx-RNTI) associated with the first UE; and wherein the method further comprises: determining that the sidelink grant is for the first UE based at least in part on determining that the sidelink grant is associated with the SL-Rx-RNTI and the SL-RNTI. Aspect 5: The method of any of Aspects 1-4, wherein the sidelink grant includes one or more fields indicating at least one of: a time gap, relative to a first slot in a sidelink resource pool associated with the first UE and the second UE, for the SCI, a hybrid automatic repeat request (HARQ) process identifier associated with the downlink communication, a new data indicator, an index of a subchannel allocation for the SCI, a frequency domain resource allocation associated with the SCI, a time domain resource allocation associated with the SCI, a physical sidelink shared channel (PSSCH) to HARQ feedback timing indication, a physical uplink shared channel (PUCCH) resource indicator for HARQ feedback associated with the downlink communication, a receive grant indicator, or a sidelink transmission configuration indicator (TCI) state associated with the first UE.

Aspect 6: The method of any of Aspects 1-5, further comprising: monitoring a portion of the SCI that is transmitted in the one or more sidelink resources; and refraining from monitoring other portions of the SCI that is transmitted in one or more other sidelink resources. Aspect 7: The method of any of Aspects 1-6, further comprising: monitoring a portion of the SCI that is transmitted in the one or more sidelink resources; and monitoring other portions of the SCI that is transmitted in one or more other sidelink resources. Aspect 8: The method of any of Aspects 1-7, wherein the sidelink grant is a common sidelink grant that is associated with the first UE and the second UE.

Aspect 9: The method of Aspect 8, wherein the downlink communication is a downlink control information (DCI) communication that is broadcasted to the first UE and the second UE. Aspect 10: The method of Aspect 8 or 9, wherein the downlink communication is associated with a sidelink link-specific radio network temporary identifier (SL-Link-RNTI) associated with the first UE and the second UE.

Aspect 11: The method of Aspect 8 or 9, wherein the downlink communication is associated with a sidelink group radio network temporary identifier (SL-G-RNTI) associated with the first UE and one or more third UEs, and wherein the first UE and the one or more third UEs are included in a group of UEs to which the second UE is to groupcast the sidelink data transmission. Aspect 12: The method of Aspect 11, wherein the sidelink grant includes one or more fields indicating at least one of: respective sidelink destination identifiers associated with each of the first UE and the one or more third UEs, or a sidelink transmission configuration indicator (TCI) associated with each of the first UE and the one or more third UEs.

Aspect 13: A method of wireless communication performed by a base station, comprising: configuring a sidelink grant associated with a first user equipment (UE), wherein the sidelink grant indicates one or more sidelink resources in which a second UE is to transmit, to the first UE, sidelink control information (SCI) that includes information associated with a sidelink data transmission from the second UE to the first UE; and transmitting, to the first UE, a downlink communication that includes an indication of the sidelink grant.

Aspect 14: The method of Aspect 13, wherein the downlink communication is a downlink control information (DCI) format 3_0 communication; and wherein the sidelink grant is a receive grant for the first UE. Aspect 15: The method of Aspect 13 or 14, wherein the sidelink grant is associated with a sidelink radio network temporary identifier (SL-RNTI) associated with the first UE and the second UE; and wherein the downlink communication includes a field indicating that the sidelink grant is for the first UE.

Aspect 16: The method of Aspect 13 or 14, wherein the sidelink grant is associated with: a sidelink radio network temporary identifier (SL-RNTI) associated with the first UE and the second UE, and a sidelink receive radio network temporary identifier (SL-Rx-RNTI) associated with the first UE. Aspect 17: The method of any of Aspects 13-16, wherein the sidelink grant includes one or more fields indicating at least one of: a time gap, relative to a first slot in a sidelink resource pool associated with the first UE and the second UE, for the SCI, a hybrid automatic repeat request (HARQ) process identifier associated with the downlink communication, a new data indicator, an index of a subchannel allocation for the SCI, a frequency domain resource allocation associated with the SCI, a time domain resource allocation associated with the SCI, a physical sidelink shared channel (PSSCH) to HARQ feedback timing indication, a physical uplink shared channel (PUCCH) resource indicator for HARQ feedback associated with the downlink communication, a receive grant indicator, or a sidelink transmission configuration indicator (TCI) state associated with the first UE.

Aspect 18: The method of any of Aspects 13-17, wherein the sidelink grant is a common sidelink grant that is associated with the first UE and the second UE. Aspect 19: The method of Aspect 18, wherein the downlink communication is a downlink control information (DCI) communication; and wherein transmitting the downlink communication comprises: broadcasting the DCI communication to the first UE and the second UE. Aspect 20: The method of Aspect 18 or 19, wherein the downlink communication is associated with a sidelink link-specific radio network temporary identifier (SL-Link-RNTI) associated with the first UE and the second UE.

Aspect 21: The method of Aspect 18 or 19, wherein the downlink communication is associated with a sidelink group radio network temporary identifier (SL-G-RNTI) associated with the first UE and one or more third UEs, and wherein the first UE and the one or more third UEs are included in a group of UEs to which the second UE is to groupcast the sidelink data transmission. Aspect 22: The method of Aspect 21, wherein the sidelink grant includes one or more fields indicating at least one of: respective sidelink destination identifiers associated with each of the first UE and the one or more third UEs, or a sidelink transmission configuration indicator (TCI) associated with each of the first UE and the one or more third UEs.

Aspect 23: An apparatus for wireless communication at a device, comprising a processor; memory coupled with the processor; and instructions stored in the memory and executable by the processor to cause the apparatus to perform the method of one or more of Aspects 1-12. Aspect 24: A device for wireless communication, comprising a memory and one or more processors coupled to the memory, the one or more processors configured to perform the method of one or more of Aspects 1-12. Aspect 25: An apparatus for wireless communication, comprising at least one means for performing the method of one or more of Aspects 1-12.

Aspect 26: A non-transitory computer-readable medium storing code for wireless communication, the code comprising instructions executable by a processor to perform the method of one or more of Aspects 1-12. Aspect 27: A non-transitory computer-readable medium storing a set of instructions for wireless communication, the set of instructions comprising one or more instructions that, when executed by one or more processors of a device, cause the device to perform the method of one or more of Aspects 1-12.

Aspect 28: An apparatus for wireless communication at a device, comprising a processor; memory coupled with the processor; and instructions stored in the memory and executable by the processor to cause the apparatus to perform the method of one or more of Aspects 13-22. Aspect 29: A device for wireless communication, comprising a memory and one or more processors coupled to the memory, the one or more processors configured to perform the method of one or more of Aspects 13-22. Aspect 30: An apparatus for wireless communication, comprising at least one means for performing the method of one or more of Aspects 13-22.

Aspect 31: A non-transitory computer-readable medium storing code for wireless communication, the code comprising instructions executable by a processor to perform the method of one or more of Aspects 13-22. Aspect 32: A non-transitory computer-readable medium storing a set of instructions for wireless communication, the set of instructions comprising one or more instructions that, when executed by one or more processors of a device, cause the device to perform the method of one or more of Aspects 13-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving, from a base station, a downlink communication that includes an indication of a sidelink grant associated with the first UE, the sidelink grant indicating that the first UE is to receive sidelink data from a second UE, the sidelink grant being associated with an identifier that distinguishes between sidelink receive grants and sidelink transmit grants; and
   identifying, based at least in part on the sidelink grant, one or more sidelink resources in which the second UE is to transmit sidelink control information (SCI) to the first UE, the SCI including information associated with a transmission from the second UE to the first UE that includes the sidelink data.

2. The method of claim 1, wherein the downlink communication is a downlink control information (DCI) format 3_0 communication; and
   wherein the sidelink grant is a receive grant for the first UE.

3. The method of claim 1, wherein the sidelink grant is associated with a sidelink radio network temporary identifier (SL-RNTI) associated with the first UE and the second UE; and
   wherein the downlink communication includes a field indicating that the sidelink grant is for the first UE.

4. The method of claim 1, wherein the sidelink grant is associated with:
   a sidelink radio network temporary identifier (SL-RNTI) associated with the first UE and the second UE, and
   a sidelink receive radio network temporary identifier (SL-Rx-RNTI) associated with the first UE; and
   wherein the method further comprises:
      determining that the sidelink grant is for the first UE based at least in part on determining that the sidelink grant is associated with the SL-Rx-RNTI and the SL-RNTI.

5. The method of claim 1, wherein the sidelink grant includes one or more fields indicating at least one of:
   a time gap, relative to a first slot in a sidelink resource pool associated with the first UE and the second UE, for the SCI,
   a hybrid automatic repeat request (HARQ) process identifier associated with the downlink communication,
   a new data indicator,
   an index of a subchannel allocation for the SCI,
   a frequency domain resource allocation associated with the SCI,
   a time domain resource allocation associated with the SCI,
   a physical sidelink shared channel (PSSCH) to HARQ feedback timing indication,
   a physical uplink control channel (PUCCH) resource indicator for HARQ feedback associated with the downlink communication,
   a receive grant indicator, or
   a sidelink transmission configuration indicator (TCI) state associated with the first UE.

6. The method of claim 1, further comprising:
   monitoring a portion of the SCI that is transmitted in the one or more sidelink resources; and
   refraining from monitoring other portions of the SCI that are transmitted in one or more other sidelink resources.

7. The method of claim 1, further comprising:
   monitoring a portion of the SCI that is transmitted in the one or more sidelink resources; and
   monitoring other portions of the SCI that are transmitted in one or more other sidelink resources.

8. The method of claim 1, wherein the sidelink grant is a common sidelink grant that is associated with the first UE and the second UE.

9. The method of claim 8, wherein the downlink communication is a downlink control information (DCI) communication that is broadcasted to the first UE and the second UE.

10. The method of claim 8, wherein the downlink communication is associated with a sidelink link-specific radio network temporary identifier (SL-Link-RNTI) associated with the first UE and the second UE.

11. The method of claim 8, wherein the downlink communication is associated with a sidelink group radio network temporary identifier (SL-G-RNTI) associated with the first UE and one or more third UEs, and wherein the first UE and the one or more third UEs are included in a group of UEs to which the second UE is to groupcast the transmission that includes the sidelink data.

12. The method of claim 11, wherein the sidelink grant includes one or more fields indicating at least one of:
respective sidelink destination identifiers associated with each of the first UE and the one or more third UEs, or
a sidelink transmission configuration indicator (TCI) associated with each of the first UE and the one or more third UEs.

13. A method of wireless communication performed by a base station, comprising:
configuring a sidelink grant associated with a first user equipment (UE), the sidelink grant indicating that the first UE is to receive sidelink data from a second UE, the sidelink grant being associated with an identifier that distinguishes between sidelink receive grants and sidelink transmit grants, the sidelink grant indicating one or more sidelink resources in which the second UE is to transmit, to the first UE, sidelink control information (SCI) that includes information associated with a sidelink data transmission from the second UE to the first UE; and
transmitting, to the first UE, a downlink communication that includes an indication of the sidelink grant.

14. The method of claim 13, wherein the downlink communication is a downlink control information (DCI) format 3_0 communication; and
wherein the sidelink grant is a receive grant for the first UE.

15. The method of claim 13, wherein the sidelink grant is associated with a sidelink radio network temporary identifier (SL-RNTI) associated with the first UE and the second UE; and
wherein the downlink communication includes a field indicating that the sidelink grant is for the first UE.

16. The method of claim 13, wherein the sidelink grant is associated with:
a sidelink radio network temporary identifier (SL-RNTI) associated with the first UE and the second UE, and
a sidelink receive radio network temporary identifier (SL-Rx-RNTI) associated with the first UE.

17. The method of claim 13, wherein the sidelink grant includes one or more fields indicating at least one of:
a time gap, relative to a first slot in a sidelink resource pool associated with the first UE and the second UE, for the SCI,
a hybrid automatic repeat request (HARQ) process identifier associated with the downlink communication,
a new data indicator,
an index of a subchannel allocation for the SCI,
a frequency domain resource allocation associated with the SCI,
a time domain resource allocation associated with the SCI,
a physical sidelink shared channel (PSSCH) to HARQ feedback timing indication,
a physical uplink control channel (PUCCH) resource indicator for HARQ feedback associated with the downlink communication,
a receive grant indicator, or
a sidelink transmission configuration indicator (TCI) state associated with the first UE.

18. The method of claim 13, wherein the sidelink grant is a common sidelink grant that is associated with the first UE and the second UE.

19. The method of claim 18, wherein the downlink communication is a downlink control information (DCI) communication; and
wherein transmitting the downlink communication comprises:
broadcasting the DCI communication to the first UE and the second UE.

20. The method of claim 18, wherein the downlink communication is associated with a sidelink link-specific radio network temporary identifier (SL-Link-RNTI) associated with the first UE and the second UE.

21. The method of claim 18, wherein the downlink communication is associated with a sidelink group radio network temporary identifier (SL-G-RNTI) associated with the first UE and one or more third UEs, and
wherein the first UE and the one or more third UEs are included in a group of UEs to which the second UE is to groupcast the sidelink data transmission.

22. The method of claim 21, wherein the sidelink grant includes one or more fields indicating at least one of:
respective sidelink destination identifiers associated with each of the first UE and the one or more third UEs, or
a sidelink transmission configuration indicator (TCI) associated with each of the first UE and the one or more third UEs.

23. A first user equipment (UE) for wireless communication, comprising:
a memory; and
one or more processors coupled to the memory, the one or more processors configured to:
receive, from a base station, a downlink communication that includes an indication of a sidelink grant associated with the first UE, the sidelink grant indicating that the first UE is to receive sidelink data from a second UE, the sidelink grant being associated with an identifier that distinguishes between sidelink receive grants and sidelink transmit grants; and
identify, based at least in part on the sidelink grant, one or more sidelink resources in which the second UE is to transmit sidelink control information (SCI) to the first UE, the SCI including information associated with a transmission from the second UE to the first UE that includes the sidelink data.

24. The first UE of claim 23, wherein the downlink communication is a downlink control information (DCI) format 3_0 communication; and
wherein the sidelink grant is a receive grant for the first UE.

25. The first UE of claim 23, wherein the sidelink grant is associated with a sidelink radio network temporary identifier (SL-RNTI) associated with the first UE and the second UE; and
wherein the downlink communication includes a field indicating that the sidelink grant is for the first UE.

26. The first UE of claim 23, wherein the sidelink grant is associated with:
a sidelink radio network temporary identifier (SL-RNTI) associated with the first UE and the second UE, and
a sidelink receive radio network temporary identifier (SL-Rx-RNTI) associated with the first UE; and
wherein the one or more processors are further configured to:
determine that the sidelink grant is for the first UE based at least in part on determining that the sidelink grant is associated with the SL-Rx-RNTI and the SL-RNTI.

27. A base station for wireless communication, comprising:
- a memory; and
- one or more processors coupled to the memory, the one or more processors configured to:
  - configure a sidelink grant associated with a first user equipment (UE), the sidelink grant indicating that the first UE is to receive sidelink data from a second UE, the sidelink grant being associated with an identifier that distinguishes between sidelink receive grants and sidelink transmit grants, the sidelink grant indicating one or more sidelink resources in which the second UE is to transmit, to the first UE, sidelink control information (SCI) that includes information associated with a sidelink data transmission from the second UE to the first UE; and
  - transmit, to the first UE, a downlink communication that includes an indication of the sidelink grant.

28. The base station of claim 27, wherein the downlink communication is a downlink control information (DCI) format 3_0 communication; and
- wherein the sidelink grant is a receive grant for the first UE.

29. The base station of claim 27, wherein the sidelink grant is associated with a sidelink radio network temporary identifier (SL-RNTI) associated with the first UE and the second UE; and
- wherein the downlink communication includes a field indicating that the sidelink grant is for the first UE.

30. The base station of claim 27, wherein the sidelink grant is associated with:
- a sidelink radio network temporary identifier (SL-RNTI) associated with the first UE and the second UE, and
- a sidelink receive radio network temporary identifier (SL-Rx-RNTI) associated with the first UE.

* * * * *